United States Patent [19]

Miyake et al.

[11] 4,311,799
[45] Jan. 19, 1982

[54] NOVEL BASIC CROSS-LINKED POLYMERS

[75] Inventors: Tetsuya Miyake; Kunihiko Takeda; Akihiko Ikeda, all of Kawasaki, Japan

[73] Assignee: Asahi Kasei Kogyo Kabushiki Kaisha, Osaka, Japan

[21] Appl. No.: 54,055

[22] Filed: Jul. 2, 1979

[51] Int. Cl.³ .................... C08F 112/08; B01J 39/20
[52] U.S. Cl. ........................... 521/31; 521/32; 521/33; 521/38; 526/293; 526/310
[58] Field of Search .............. 526/293, 310; 521/32, 521/31, 33, 38

[56] References Cited

U.S. PATENT DOCUMENTS

| | | | |
|---|---|---|---|
| 2,591,573 | 4/1952 | McBurney | 521/32 |
| 2,591,574 | 4/1952 | McBurney | 521/32 |
| 2,597,440 | 5/1952 | Bodomer | 521/32 |
| 2,723,245 | 11/1955 | Wheaton | 521/32 |
| 2,788,330 | 4/1957 | Jilwood et al. | 526/293 |
| 2,874,132 | 2/1959 | Reiner | 521/32 |
| 3,817,878 | 6/1974 | Clemes et al. | 521/32 |

FOREIGN PATENT DOCUMENTS

| | | | |
|---|---|---|---|
| 4414934 | 3/1964 | Japan | 526/310 |
| 54-100489 | 8/1979 | Japan | 521/38 |
| 560421 | 7/1958 | United Kingdom | 521/32 |
| 600182 | 6/1960 | United Kingdom | 521/32 |

Primary Examiner—William F. Hamrock
Assistant Examiner—Peter Kulkosky
Attorney, Agent, or Firm—Sprung, Felfe, Horn, Lynch & Kramer

[57] ABSTRACT

A basic copolymer whose main chain is cross-linked which comprises about 6 to about 98% by weight of recurring units of Formula (A) or (B),

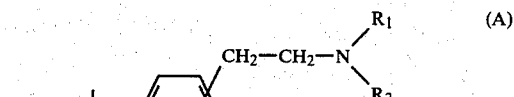

or

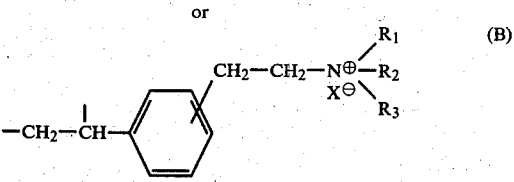

wherein $R_1$, $R_2$ and $R_3$, which may be the same or different, each represents a hydrogen atom or a hydrocarbon group selected from the group consisting of $C_{1-20}$ alkyl groups, $C_{3-10}$ cycloalkyl groups, $C_{3-8}$ alkenyl groups, $C_{6-15}$ aryl groups, $C_{7-12}$ arylalkyl groups and $C_{1-15}$ aminoalkyl groups; and X is an acid radical, and about 2 to about 94% by weight of cross-linked units based on the total weight of the recurring units of Formula (A) or (B) and the cross-linked units and, if desired, up to about 92% by weight of units of a monoethylenically unsaturated monomer or a conjugated monomer based on the total weight of the recurring units of Formula (A) or (B), the cross-linked units and the units of the monoethylenically unsaturated monomer or the conjugated monomer.

21 Claims, No Drawings

NOVEL BASIC CROSS-LINKED POLYMERS

BACKGROUND OF THE INVENTION

1. Field of the Invention

This invention relates to a novel basic cross-linked copolymer having substituted aminoethyl groups and a process for the production thereof.

2. Description of the Prior Art

Various cross-linked copolymers having substituted aminomethyl groups are known. Of these cross-linked copolymers, weakly basic anion ion-exchange resins having dialkylaminomethyl groups and strongly basic anion ion-exchange resins having trialkylammonium methyl groups ($R_1$ $R_2$ $R_3$ $N^\oplus CH_2$—:$R_1$, $R_2$, $R_3$, each being an alkyl group) are representative ones and it might be said that almost all the commercially available anion exchange resins are of these types. The conventionally known representative method of preparing these resins comprises reacting a starting polymer such as a divinylbenzene-styrene copolymer with chloromethyl methyl ether in the presence of a Friedel-Crafts catalyst to produce a chloromethylated polymer and aminating the chloromethylated polymer with a dialkylamine or a trialkylamine. However, according to this method, cross-linking reaction often occurs as a side reaction in the chloromethylation to disadvantageously increase the degree of cross-linking and to reduce the exchange capacity. With high degrees of cross-linking the subsequent amination does not complete. Furthermore, the harm of haloalkyl ethers such as chloromethyl methyl ether is recently at issue.

SUMMARY OF THE INVENTION

According to the present invention there is provided a basic copolymer whose main chain is cross-linked which comprises about 6% to about 98% by weight of recurring units of Formula (A) or (B),

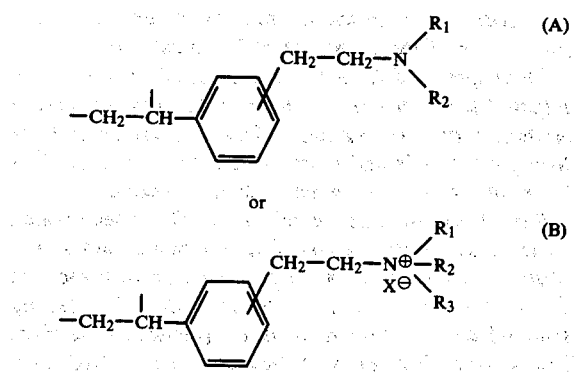

wherein $R_1$, $R_2$, $R_3$, which may be the same or different, each represents a hydrogen atom or a hydrocarbon group selected from the group consisting of $C_{1-20}$ alkyl groups, $C_{3-10}$ cycloalkyl groups, $C_{3-8}$ alkenyl groups, $C_{6-15}$ aryl groups, $C_{7-12}$ arylalkyl groups and $C_{1-15}$ aminoalkyl groups; and X represents an acid radical, and about 2% to about 94% by weight of cross-linked units based on the total weight of the recurring units of Formula (A) or (B) and the cross-linked units, and a process for the production thereof.

DETAILED DESCRIPTION OF THE INVENTION

Specific examples of suitable $R_1$, $R_2$ and $R_3$ groups in Formulae (A) and (B) as described above include hydrogen atom; $C_{1-20}$ alkyl groups such as methyl, ethyl, n-propyl, isopropyl, n-butyl, isobutyl, sec-butyl, tert-butyl, n-pentyl, isopentyl, n-hexyl, n-heptyl, n-octyl, 2-ethylhexyl, n-nonyl, n-decyl, n-dodecyl, n-tetradecyl, n-hexadecyl and n-octadecyl; $C_{3-10}$ cycloalkyl groups such as cyclopropyl, cyclobutyl, cyclopentyl, cyclohexyl, cycloheptyl and cyclooctyl; $C_{3-8}$ alkenyl groups such as allyl, crotyl and hexenyl; $C_{6-15}$ aryl groups such as phenyl, toluyl, trimethylphenyl, diethylphenyl, naphthyl and biphenyl; $C_{7-12}$ arylalkyl groups such as benzyl, α-phenethyl, β-phenethyl, γ-phenethyl and phenyl-tert-butyl; and $C_{1-15}$ aminoalkyl groups such as aminoethyl, aminopropyl, aminohexyl and aminododecyl. Of these hydrocarbons, the $C_{1-20}$ alkyl groups and the $C_{1-15}$ aminoalkyl groups are preferred from their ease in the preparation of the starting monomeric materials. When the $C_{1-20}$ alkyl groups are employed, the nitrogen content per unit weight of the copolymer is preferably more increased with reduced numbers of carbon atoms. Thus, it is more preferred to employ $C_{1-8}$ alkyl groups and $C_{1-8}$ aminoalkyl groups. Preferred combinations of the $R_1$ and $R_2$ groups in Formulae (A) and (B) include $R_1=CH_3$ and $R_2=CH_3$; $R_1=C_2H_5$ and $R_2=C_2H_5$; $R_1=H$ and $R_2=C_2H_5$; $R_1=H$ and $R_2=n-C_3H_7$ or iso—$C_3H_7$; $R_1=H$ and $R_2=\text{cyclo}C_6H_{11}$; and $R_1=CH_2CH_2NH_2$ and $R_2=CH_2CH_2NH_2$. The combinations of $R_1=R_2=H$; and $R_1=H$ and $R_2=CH_3$ have difficulty in the preparation of starting monomeric materials. The copolymers where the $$-CH_2-\overset{|}{CH}-$$

group is in the para position to the

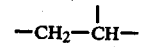

group or the

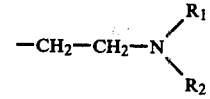

group have such advantages that the preparation of the starting monomeric materials are easy and various functions originating from the nitrogen atom can be fully exhibited due to the reduced steric hindrance of the nitrogen affected in the copolymers.

The X group in Formula (B) represents a so-called acid radical. Specific examples of suitable X groups include halogen atoms such as F, Cl, Br and I; inorganic anions such as $1/2SO_4$, $1/2SO_3$, $HSO_4$, $NO_3$, $NO_2$, $1/2CrO_4$, SCN, $ClO_4$, OH, $H_2PO_4$, $1/2HPO_4$, $1/3PO_3$, $HCO_3$, $1/2CO_3$, CN and $MnO_4$; carboxylate anions of $R_4COO$ wherein $R_4$ is a $C_{1-20}$ alkyl group, a $C_{6-15}$ aryl group, a $C_{1-10}$ haloalkyl group or a $C_{1-10}$ hydroxyalkyl group, such as HCOO, $CH_3COO$, $C_2H_5COO$, CH₃(CH₂)₈COO, CH₃(CH₂)₁₆COO, C₆H₅COO, CH₃C₆H₅COO, CH₂ClCOO, CH₂FCOO and CH₃CH(OH)COO; sulfonate anions of $R_5SO_3$ wherein $R_5$ is a methyl group, an ethyl group or a $C_{6-20}$ aryl group, such as $CH_3SO_3$, $C_2H_5SO_3$, $C_6H_5SO_3$, $CH_3C_6H_4SO_3$ and $C_{12}H_{25}C_6H_4SO_3$; and sulfuric ester anions such as $CH_3OSO_3$ and $C_2H_5OSO_3$.

The shape or form of the copolymers of this invention is not particularly limited, and the copolymers may be in the form of a mass, a pulverized particle, a spherical particle or a membrane. When the copolymers of this invention are packed in a column and used as ion exchange resins or adsorbents, spherical particles are preferred for practical purposes.

The copolymers of this invention can be produced by polymerizing a monomer mixture comprising about 6% to about 98% by weight of a monomer of Formula (C),

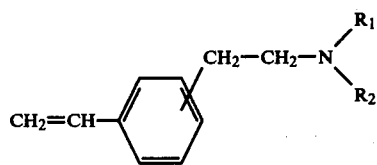
(C)

wherein $R_1$ and $R_2$ are the same as defined above, and about 2% to about 94% by weight of a cross-linkable monomer having a plurality of vinyl groups based on the total weight of the monomer of Formula (C) and the cross-linkable monomer. A preferred amount of the monomer of Formula (C) ranges from about 10% to about 90% by weight based on the total weight of the monomer of Formula (C) and the cross-linkable monomer. A more preferred amount ranges from about 20% to about 80% by weight base on the total weight of the monomer of Formula (C) and the cross-linkable monomer.

The monomer of Formula (C) can be produced by reacting an amine of the Formula (D),

(D)

wherein $R_1$ and $R_2$ may be the same or different and each represents a hydrogen atom or a hydrocarbon group selected from the group consisting of $C_{1-20}$ alkyl groups, $C_{3-10}$ cycloalkyl groups, $C_{3-8}$ alkenyl groups, $C_{6-15}$ aryl groups, $C_{7-12}$ arylalkyl groups and $C_{1-15}$ aminoalkyl groups, with divinylbenzene in the presence of an alkali metal amide of Formula (E),

(E)

wherein $R_1$ and $R_2$ are the same as defined above and M represents an alkali metal.

The divinylbenzene employed may be the para-, meta- or orthoisomer of divinylbenzene and of these isomers, p-divinylbenzene is preferred due to the high reactivity.

When the number of carbon atoms in $R_1$ and $R_2$ is too large, the molecular weight of the product becomes higher and as a result, the separation of the product by distillation or other methods becomes difficult. Ammonia ($R_1=R_2=H$) and methylamine (one of $R_1$ and $R_2=H$, the other$=CH_3$) may be employed but their reactivity is remarkably low and the amount of the monomer of Formula (C) obtained is disadvantageously too small.

Examples of suitable amines of Formula (D) include ethylamine, n-propylamine, isopropylamine, n-butylamine, sec-butylamine, tert-butylamine, n-pentylamine, isopentylamine, n-hexylamine, n-heptylamine, 2-ethylhexylamine, n-nonylamine, n-decylamine, n-dodecylamine, n-tetradecylamine, n-hexadecylamine, n-octadecylamine, dimethylamine, diethylamine, di-n-propylamine, di-n-butylamine, di-n-octylamine, cyclohexylamine, cyclopentylamine, dicyclopropylamine, dicyclohexylamine, allylamine, diallylamine, crotylamine, benzylamine, phenethylamine, aniline, N-methylaniline, ethylenediamine, hexamethylenediamine, diethylenetriamine, N-methylethylenediamine and N-ethylethylenediamine.

The alkali metals represented by M employed include lithium, sodium and potassium. Of these alkali metals, lithium is preferred due to its high reactivity and easy reaction operation.

The lithium amide which can be preferably employed in the preparation of the monomer of Formula (C) can be prepared by reacting an amine of the formula (D) with a $C_{1-20}$ alkyllithium, phenyllithium, lithium hydride or lithium aluminum hydride. Of these lithium compounds, the $C_{1-20}$ alkyllithium is especially preferred due to its high solubility in a solvent and ease in handling.

Examples of suitable alkyllithiums which may be employed include methyllithium, ethyllithium, n-butyllithium, n-octyllithium and the like. Of these alkyllithiums, commercially produced n-butyllithium is especially preferred and from the standpoint of availability.

The lithium amide of Formula (E) has catalytic activity which is one of the characteristic features of the preparation of the monomer of Formula (C).

More specifically, the lithium amide of Formula (E) is required to be used in an amount of less than equimolar amount of divinylbenzene, preferably from about 0.001 to about 0.5 mole and more preferably from about 0.01 to about 0.2 mole per mole of divinylbenzene.

Since the lithium amide of Formula (E) is deactivated by the reaction with a compound having an active hydrogen such as water, an alcohol or an acid present in the reaction system, it is preferred that the starting material and the solvent used are previously purified. But when such compounds having an active hydrogen cannot be removed but remain in the reaction mixture, it is preferred to use the lithium amide of Formula (E) in an amount greater than required.

The amine of Formula (D) undergoes stoichiometric reaction with divinylbenzene and is preferably used in an amount of from about 0.3 to about 2.5 moles, more preferably from about 0.6 to 1.3 moles per mole of divinylbenzene. If the amount of the amine of Formula (D) is too small, the yield of the product is reduced. If an excess amount is used, there can be disadvantageously produced a by-product of the Formula (F),

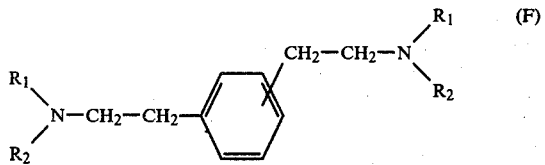

wherein $R_1$ and $R_2$ are the same as defined above.

The by-product of Formula (F) can be more easily produced with m-divinylbenzene is employed than with p-divinylbenzene.

The reaction of a mixture of the lithium amide of Formula (E) and the amine of Formula (D) with divinylbenzene can be conducted by the following two methods. One method comprises adding a mixture of the lithium amide of Formula (E) and the amine of Formula (D) to divinylbenzene. This method has an advantage that formation of the by-product of Formula (F) can be suppressed. The other method comprises adding divinylbenzene to a mixture of the lithium amide of Formula (E) and the amine of Formula (D). In this case, it is only required to use one reaction vessel. Another advantage is that the moisture sensitive lithium amide solution need not be transferred. Especially when ethylamine or dimethylamine is used as the amine of Formula (D), it is preferred to use the second method wherein divinylbenzene is added under cooling to a mixture of lithium ethyl amide or lithium dimethylamide and ethylamine or dimethylamine which is gaseous at room temperature.

The reaction of the present invention can also be conducted in the presence of an inert solvent. Examples of suitable solvents which can be employed include aliphatic hydrocarbons such as pentane, hexane, cyclohexane and octane; aromatic hydrocarbons such as benzene and toluene; ethers such as diethyl ether, dioxane and tetrahydrofuran, aprotic polar solvents such as dimethyl sulfoxide, N,N-dimethylformamide, and hexamethylphosphoric triamide; and other liquids which do not react with the lithium amide of Formula (E) under the reaction conditions. Of these solvents, n-hexane, cyclohexane, benzene and tetrahydrofuran are preferred. In particular, when tetrahydrofuran is used, the rate of reaction is increased to shorten the reaction time. The aliphatic hydrocarbons such as n-hexane can be frequently used as completely inert solvents.

The amount of the solvent used typically ranges from about 0.1 to about 50 times and preferably about 0.5 to about 20 times the volume of divinylbenzene. If the amount of the solvent is increased, the reaction is generally retarded.

The reaction can be conducted at a temperature which is not particularly limited, but typically at about $-80°$ C. to about 150° C., preferably at about $-30°$ C. to about 100° C. and more preferably at about $-20°$ C. to about 60° C. When the reaction is performed at a temperature higher than the boiling point of the amine of Formula (D) or the solvent, it is necessary to use a pressure reaction vessel. The reaction mixture is preferably subjected to stirring or shaking.

The reaction time which is not particularly limited typically ranges from one minute to about 24 hours and preferably from about 5 minutes to about 8 hours. The rate of reaction greatly depends upon the temperature selected, the amine of Formula (D) employed, the concentration of the starting material and the solvent employed.

In order to terminate the reaction, it is convenient to deactivate the lithium compound with an alcohol such as ethanol or propanol or water. The monomer of Formula (C) which is the reaction product may be separated by distillation or column chromatography. Alternatively, hydrochloric acid or hydrogen chloride gas may be added to the reaction mixture to effect precipitation of the monomer of Formula (C) as its hydrochloride. A more efficient isolation can also frequently be conducted by subjecting the reaction mixture to pretreatment with addition of water, followed by extraction.

The method of preparing diethylaminoethylstyrene [$R_1 = R_2 = C_2H_5$ in Formula (C)] is disclosed in "Makromolekulare Chemie", 177, 3255-3263 (1976), by Teiji Tsuruta et al.

The cross-linkable monomers which can be employed in this invention have a plurality of vinyl groups and preferably 2 to 4.

Examples of suitable cross-linkable monomers having a plurality of vinyl groups which can be employed in this invention include:

(i) Compounds of the formula,

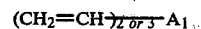

wherein
$A_1$ is a $C_{6-14}$ aromatic hydrocarbon radical, a pyridine nucleus or a quinoline nucleus, such as divinylbenzenes, divinyltoluenes, divinylxylenes, divinylnaphthalenes, divinylethylbenzenes, trivinylbenzenes, divinylpyridines, divinylquinolines, etc.;

(ii) Compounds of the formula,

wherein
$A_2$ is $-CO-$, $-SO_2-$ or

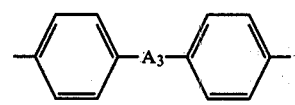

group wherein
$A_3$ is $-O-$, $-NH-$, $-S-$, $-SO_2-$, $-SO-$ or $-(CH_2)_l-$ group wherein
$l$ is zero or an integer of 1 to 4,
such as divinyl ketone, divinyl sulfone, bisvinylphenyl ethers, divinyldiphenylamines, divinyldiphenyl sulfide, divinyldiphenyl sulfone, divinyldiphenyl sulfoxide, divinyldiphenyls, divinyldiphenylmethanes, diphenyldibenzyls, etc.;

(iii) Compounds of the formula,

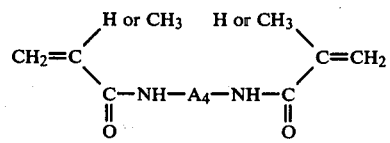

wherein $A_4$ is —$(CH_2)_p$— group wherein p is an integer of 1 to 6, such as N,N'-methylenebisacrylamide, N,N'-methylenebismethacrylamide, N,N-trimethylenebisacrylamide, N,N'-trimethylenebismethacrylamide, N,N-hexamethylenebisacrylamide and N,N'-hexamethylenebisacrylamide, etc.;

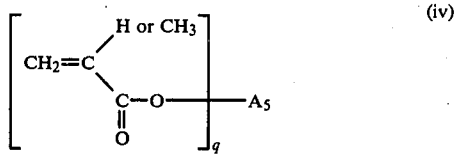

wherein
q is an integer of 2 to 4,
$A_5$ is a radical of a polyol having q terminal hydroxyl group and a number average molecular weight of at most 1000, such as ethyleneglycol di-acrylate or -methacrylate, diethyleneglycol di-acrylate or -methacrylate, triethyleneglycol di-acrylate or -methacrylate, tetraethyleneglycol di-acrylate or -methacrylate, polyethyleneglycol (number average molecular weight: 200 to 1,000) di-acrylate or -methacrylate, propyleneglycol di-acrylate or -methacrylate, dipropylene glycol di-acrylate or -methacrylate, polypropyleneglycol (number average molecular weight: 100 to 1,000) di-acrylate or -methacrylate, butyleneglycol di-acrylate or -methacrylate, trimethylolethane triacrylate or -methacrylate, trimethylolpropane tri-acrylate or -methacrylate, pentaerythritol tetra-acrylate or -methacrylate, neopentylglycol diacrylate or -methacrylate, dibromoneopentyl glycol di-acrylate or -methacrylate, 1,8-octanediol di-acrylate or -methacrylate, 1,9-nonanediol di-acrylate or -methacrylate, 1,10-decanediol di-acrylate or -methacrylate, 1,12-dodecanediol di-acrylate or -methacrylate and 1,18-octadecanediol di-acrylate or -methacrylate, etc.;

(v) Compounds of the formula,

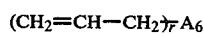

$(CH_2=CH-CH_2)_r A_6$ wherein
r is an integer of 2 or 3,
$A_6$ is a radical of a di- or tricarboxylic acid having 2 to 10 carbon atoms, such as diallyl oxalate, diallyl maleate, diallyl fumarate, diallyl adipate, diallyl phthalate, diallyl tartrate, triallyl tricarballylate, triallyl trimellitate, triallyl trimesate, etc.; and (vi) Other cross-linkable monomers having a plurality of vinyl groups such as diallyl carbonate, triallyl phosphate, triallyl isocyaurate, 1,3,5-triacryloylhexahydro-1,3,5-triazine, diallylmelamine, N-acroylacrylamide, diallylamine, triallylamine, etc.

Of these compounds, divinylbenzenes and the compound of the formula,

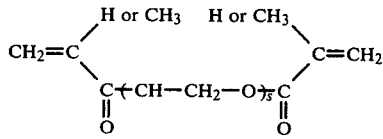

wherein s is an integer of 1 to 20, are preferred.

Such cross-linkable monomers can be employed in an amount of from about 2% to about 94% by weight and preferably from about 10% to about 90% by weight based on the total weight of the monomer of Formula (C) and the cross-linkable monomer. When the amount is less than about 2% by weight, swelling or contraction of the resulting copolymers are increased and the mechanical strength is decreased. On the other hand, when the amount is higher than about 94% by weight, the degree of cross-linking is excessively increased and correspondingly, the amount of the monomer of Formula (C) is disadvantageously reduced.

Further, in this invention the monomer mixture may contain a monoethylenically unsaturated monomer or a conjugated monomer in an amount of at most about 92% by weight, preferably at most about 60% by weight and more preferably at most about 40% by weight based on the total weight of the monomer mixture.

Examples of suitable monoethylenically unsaturated monomers include hydrocarbon compounds such as styrene, methylstyrenes, ethylstyrenes, vinylnaphthalenes; styrene derivatives such as chlorostyrenes, bromostyrenes, N,N-dimethylaminostyrenes, nitrostyrenes and chloromethylaminostyrenes; vinyl sulfide derivatives such as methyl vinyl sulfide and phenylvinyl sulfide; acrylic acid and methacrylic acid; itaconic acid; acrylic acid esters such as methyl acrylate and chloromethyl acrylate; methacrylic acid esters such as cyclohexyl methacrylate, dimethylaminoethyl methacrylate, glycidyl methacrylate, tetrahydrofurfuryl methacrylate and hydroxyethyl methacrylate; itaconic acid esters such as dimethyl itaconate, diethyl itaconate and di-n-butyl itaconate; vinyl ketones such as methyl vinyl ketone and ethyl isopropenyl ketone; vinylidene compounds such as vinylidene chloride and vinylidene bromide; acrylamide derivatives such as acrylamide, N-butoxymethyl acrylamide and N,N-dimethylaminoethyl acrylamide; vinyl esters of carboxylic acids such as vinyl acetate and vinyl caprate; thio-carboxylic acid derivatives such as methyl thioacrylate and vinyl thioacetate; and heterocyclic vinyl compounds such as N-vinylsuccinimide, N-vinylpyrrolidone, N-vinylphthalimide, N-vinylcarbazole, vinylfurans, vinylimidazoles, methylvinylimidazoles, vinylpyrazoles, vinyloxazolidones, vinylthiazoles, vinylpyridines, methylvinylpyridines, 2,4-dimethyl-6-vinyltriazine; and acrylonitrile and methacrylonitrile; and any mixtures thereof.

Examples of suitable conjugated monomers include 1,3-butadiene, isoprene, chloroprene and piperylene.

In addition, porous cross-linked copolymers can be produced according to this invention, for example, by polymerizing a monomer mixture comprising a monomer of Formula (C) and a cross-linkable monomer having a plurality of vinyl groups in the presence of an organic liquid reaction medium which does not react with the monomer mixture and/or in the presence of a linear polymer. When these additives have a high affinity for the copolymer formed by the polymerization, the pore diameter becomes small. With lower affinities of the additives for the copolymer formed, the pore diameter is more increased. The pore volume of the copolymer fundamentally depends upon the amount of the additive to the monomer mixture. These porous cross-linked copolymers can be produced by the method as described in "Advance of Polymer Science", 5, 113–213 (1967), by J. Seidel, J. Malinsky, K. Dusek and W.

Heitz. A preferred method is the one as described in U.S. Pat. No. 4,093,570.

The polymerization of this invention is preferably carried out in the presence of a radical initiator. Such radial initiators include, for example, peroxides such as benzoyl peroxide, lauroyl peroxide, di-tertbutyl peroxide, dicumyl peroxide, methyl ethyl ketone peroxide, cumene hydroperoxide, tert-butyl hydroperoxide; and azo compounds such as azobisisobutyronitrile, 2,2'-azobis(2,4-dimethyl valeronitrile), 2-phenylazo-2,4-dimethyl-4-methoxy valeronitrile and 2-cyano-2-propylazoformamide. Of these radical initiators, azo compounds are preferred due to their high reactivity.

The amount of the radical initiator employed may vary depending upon factors such as the polymerization temperature selected, the organic liquid reaction medium chosen, the amount of organic liquid reaction medium employed and other factors. Generally, however, the amount is from about 0.01 to about 12 percent by weight based on the total weight of the monomer mixture. A preferred range is from about 0.1 to about 5 percent by weight, and a more preferred range is from about 0.2 to about 3 percent by weight. Two or more of these initiators having different half life periods may also be employed.

The organic liquid reaction media which can be employed is, for example, described in the "Advance of Polymer Science" as described above.

Radical polymerization methods by irradiation of light or other radiation may also be employed in this invention.

The polymerization temperature is typically from 0° C. to 200° C., a preferred range is from 15° C. to 160° C., and a more preferred range is from 30° C. to 130° C.

The time of the polymerization may be varied within wide limits depending upon factors such as the radical initiator selected, the amount of radical initiator employed, the organic liquid reaction medium chosen, the monomers selected, the ratio of monomers to organic liquid reaction medium and other factors. Generally, the polymerization time is from about 30 minutes to about 50 hours. A preferred time is from about 1 to about 30 hours, and a more preferred time is from about 2 to about 20 hours. The conventional method of raising the polymerization temperature during polymerization is preferred in the present invention as a way of shortening the polymerization time.

The type of polymerization of this invention may be either bulk polymerization or solution polymerization or suspension polymerization or emulsion polymerization. When the particle copolymers of this invention which are suitable for ion-exchange resins and adsorbents are produced, a preferred polymerization type is suspension polymerization.

It is preferred to employ a suspending agent when carrying out the suspension polymerization.

Exemplary suspending agents which may be employed in the suspension polymerization in water include, for example, viscous substances such as gum arabic, alginic acid, tragacanth, agar-agar, methyl cellulose, hydroxyethyl cellulose, carboxymethyl cellulose, starch, gelatin glue; synthetic high molecular weight polymers such as sodium polyacrylate, polyvinyl alcohol, polyvinyl pyrrolidone; inorganic substances such as kaolin, bentonite, a hydrated complex of magnesium silicate, titanium dioxide, zinc oxide, calcium carbonate, talcum, barium sulphate, hydroxyapatite, aluminum hydroxide, calcium oxalate.

If necessary or if desired, it is effective to additionally employ pH adjusting agents such as sodium phosphate, sodium dihydrogen phosphate, ammonium sulphate, sodium acetate, sodium hydrogen carbonate and anion surfactants including soaps of fatty acids, sodium dodecyl benzene sulphonate, sodium dodecyl sulphate and sodium lauryl sulphate, in the suspension polymerization in water. The suspending agent, the pH adjusting agent and the anion surfactant can each be employed, respectively, in an amount of from about 0.001 to about 10 percent, preferably from about 0.01 to about 5 percent, more preferably from about 0.02 to about 3 percent, by weight based on the weight of the water employed.

The weight ratio of water to the mixture of monomers and organic liquid reaction medium which may be employed in the suspension polymerization in water is from about 0.5 to about 15, preferably from about 1 to about 10, and more preferably from about 2 to about 8.

The polymers which are obtained under the above described polymerization conditions still contain unreacted monomers and optionally organic liquid reaction medium. Such unreacted monomers and organic liquid reaction medium can effectively be removed by: (1) a method comprising immersing the polymers in a water soluble medium, which dissolves the monomer and organic medium, for at least about 2 to about 5 hours, subsequently filtering the polymers and washing the polymers with water: or (2) a method comprising placing the polymers in a column and passing a water soluble medium which dissolves the monomer mixture and organic liquid medium, and subsequently water, through the column.

Exemplary washing media including methanol, ethanol, acetone, dioxane, acetonitrile and dimethyl formamide which are soluble in water. Such washing media remaining in the polymers can readily and easily be eliminated by washing with water.

The mass of the polymeric product thus obtained can be pulverized to particles of the product or cut into thin membranes of the product. Also, the monomer mixture can be polymerized into a sheet of the polymeric substance.

The method of identifying the copolymers of this invention will now be described.

The copolymers of this invention have a three-dimensionally cross-linked structure and accordingly, many conventional methods which can be used in the identification of general linear copolymers cannot be used. That is, the conception of molecular weight cannot be used due to the three-dimensional structure of the copolymers, and neither the determination of atomic arrangement by NMR spectral analysis nor the measurement of viscosity are possible since the copolymers are insoluble in any solvents.

In this invention, the following method is employed.

First, the amount of unreacted monomers after completion of the polymerization is quantitatively analyzed by gas or liquid chromatography to measure a yield of polymerization and the chemical composition of the copolymer is calculated and then the copolymer produced is subjected to elemental analysis to confirm the chemical composition of the copolymer. Secondly, the degree of cross-linking can be calculated from the weight ratio of the cross-linkable monomer polymerized to the total monomer mixture polymerized. Thirdly, the swellability of the copolymer in case of changing an external liquid medium which is one physical quantity governed by the chemical composition, physical structure or porous structure and degree of cross-linking of the copolymer can be evaluated by measuring the height of the copolymer in a column equipped with a glass filter or measuring the particle diameter of the copolymer by a microscope. Fourthly, the quantitative analysis of the ion-exchange groups of the copolymer is conducted by measuring the ion-exchange capacity of the copolymer. Fifthly, the density of the copolymer can be measured by the helium substitution method. Further, when the copolymer is porous, the average pore diameter and pore volume can be measured for the method of determining the porosity by a porosimeter as will be described below.

Thus, it is possible to determine various fundamental properties and the chemical composition of the copolymer of this invention but it is impossible to determine the arrangement of repeating units and the three-dimensionally cross-linked structure of the copolymer. It can be assumed that the copolymers of this invention have a structure similar to the conventional three-dimensionally cross-linked structure as described in "Ion Exchange Resins", Chapter 5, by Robert Kunin, published by Robert E. Krieger Publishing Company, Huntington, N.Y. (1972).

When the monomer mixture is subjected to bulk polymerization or suspension polymerization, a copolymer of gel type resin can be obtained. The gel type resin advantageously has a large amount of functional groups per unit volume and a high mechanical strength. However, when the gel type resin is employed in a medium which does not swell the resin, the diffusion coefficient of the resin is remarkably reduced and it is difficult to efficiently use the functional groups. Therefore, preferably macroporosity is imparted to the copolymer, so that the properties of the copolymer as a cross-linked functional polymer such as an ion-exchange resin and an adsorbent can be remarkably improved as described in detail, for example, in the "Advance of Polymer Science" as described above.

The porous structure of porous copolymers is measured by mercury pressure porosimetry which is described in detail in "Fine Particle Measurement", Chapter 10, by Clyde Orr, Jr. and J. M. Dallavalle, published by Macmillan Co., New York (1959). The measurement is conducted basically by the method in accordance with ANSI/ASTM D2873-70 (Reapproved 1976) using a Mercury Penetration Porosimeter, Model 905-1 (manufactured and sold by Micromeritics Instrument Corporation, U.S.A.). In this method, even pores having a pore diameter as small as 35–40 Å can be measured. In the present invention, the term "pore" means an open pore communicated to the outside surface of the copolymer and having a pore diameter of at least about 40 Å, and the pore volume is determined with regard to such open pores. The penetrometer readings versus the total absolute pressure are plotted on four phase semilog graph paper and the points are connected using a French curve. The curve obtained represents a profile of the apparent interval pore size distribution. The "average pore diameter" is defined to be a value of r providing a maximum value of dV/d log r in the curve obtained where r represents a pore diameter and V denotes a cumulative pore volume measured by the mercury penetration porosimeter. In the present invention, the "total pore volume" is defined to be a volume of mercury forced into pores of 1 g of the dry copolymer as the sample during the period in which the mercury pressure is increased from 56 psi to 50,000 psi in the mercury penetration method.

In this invention, when the average pore diameter of the copolymer is too small, diffusion velocity of adsorbates is greatly reduced. On the other hand, too large average pore diameters result in disadvantages such as diminution of the surface area having a great influence on the adsorbability and reduction of the mechanical strength. The average pore diameter of the polymer typically ranges from about 40 Å to about 9,000 Å. A preferred average pore diameter ranges from about 60 Å to 5,000 Å and a more preferred average pore diameter ranges from about 60 Å to about 3,000 Å.

Also, the pore volume is a factor which significantly influences on adsorbability. When the pore volume is too small, a sufficient adsorbing surface cannot be obtained. On the other hand, when the pore volume is too large, the mechanical strength of the copolymer is decreased. In this invention, the total pore volume typically ranges from about $0.05\sqrt{Y}$ ml to about $1.5\sqrt{Y}$ ml per gram of the dry copolymer, wherein Y represents the percent by weight of the cross-linkable monomer based on the total weight of the monomer mixture. A preferred total pore ranges from about $0.2\sqrt{Y}$ ml to about $1.3\sqrt{Y}$ ml per gram of the dry copolymer.

The bulk density is another index of porosity. In the present invention, the bulk density is determined by to the following method:

A sample copolymer is filled in a column equipped with a glass filter, and water is sufficiently flowed through the column and the volume of the sample-packed portion of the column is measured. Then the sample is sufficiently dried and weighed, and then the bulk density is calculated by dividing the weight by the volume.

The copolymers of this invention are weakly basic and have an adsorbability for acidic substances and act as a weakly basic anion exchanger in an acidic solution.

When the copolymer of this invention are reacted or neutralized with an acid which is denoted as HX, all or part of the recurring units of Formula (A),

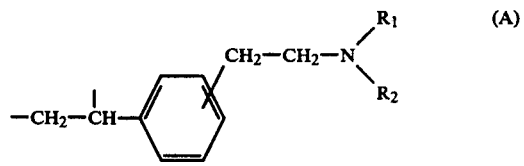

in the copolymer are converted into recurring units of Formula (B)',

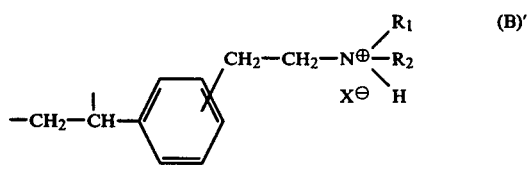

wherein $R_1$ and $R_2$ are the same as in Formula (A), but when $R_1$ and/or $R_2$ is a $C_{1-15}$ aminoalkyl group, the $C_{1-15}$ aminoalkyl group becomes a

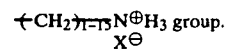

group.

Exemplary acids of HX include mineral acids such as hydrogen fluoride, hydrogen chloride, hydrogen bromide, hydrogen iodide, sulfuric acid, sulfurous acid, nitric acid, nitrous acid, chromic acid, thiocyanic acid, perchloric acid, phosphoric acid, carbonic acid and permanganic acid; carboxylic acids such as formic acid, acetic acid, propionic acid, n-capric acid and stearic acid; substituted carboxylic acid such as monochloroacetic acid, monofluoroacetic acid, lactic acid, benzoic acid and toluic acid; and sulfonic acids such as benzenesulfonic acid, p-toluenesulfonic acid, dodecylbenzenesulfonic acid, methanesulfonic acid and ethanesulfonic acid.

The amount of the acid of HX which can be employed is not limited and typically ranges from about 0.01 to about 100 equivalents based on the total nitrogen atoms of the copolymer.

In the reaction or neutralization with an acid, the copolymer which can be employed may be the one either as such or washed or dried after the polymerization. The acids can be employed either in their pure form or as their solution.

Also, the copolymer of this invention can be quaternized with a quaternizing agent of $R_3X$ to give a copolymer having recurring units of Formula (B),

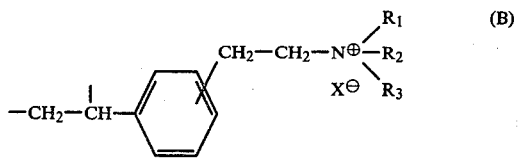

wherein $R_1$, $R_2$, $R_3$ and X are the same as defined above excluding $R_3=H$.

Exemplary quaternizing agents of $R_3X$ include halogenated alkyls, alkenyls or aryls such as methyl iodide, methyl bromide, methyl chloride, ethyl chloride, ethyl bromide, n-octyl bromide, n-dodecyl chloride, cyclohexyl chloride and cycloheptyl bromide; allyl bromide and crotyl chloride; and benzyl bromide and phenethyl chloride, and dialkyl sulfates such as dimethyl sulfate and diethyl sulfate.

The quaternization agent can be applied either in the liquid phase or as a gas.

The amount of the quaternizing agents of $R_3X$ which can be employed is not limited and typically ranges from about 0.01 to about 100 equivalents based on the total nitrogen atoms of the copolymer.

When the gaseous quaternizing agent is employed as a gas, the quaternization can be conducted in an autoclave or by suspending the starting copolymer in a solvent and blowing the gaseous quaternizing agent into the suspension formed. When the quaternizing agent is employed in the liquid phase, the quaternization can be conducted by mixing the liquid quaternizing agent with the starting copolymer in the presence or absence of unreactive solvent. Appropriate unreactive solvents for conducting the quaternization in the liquid phase are highly polar solvents or those which swell the copolymers and include acetone, methanol, ethanol, N,N-dimethylformamide and dimethyl sulfoxide. However, the most preferred solvent should be selected depending upon the quaternization agent employed and the reaction condition chosen.

It is preferred that the copolymer which can be employed in the quaternization is purified by thoroughly washing with the unreacted solvent or dried prior to use.

Further, the copolymer having recurring units of Formula (B) or (B)' can be produced by polymerizing a monomer mixture comprising a monomer of Formula (H),

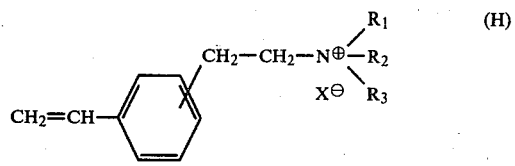

wherein $R_1$, $R_2$, $R_3$ and X is the same as defined above, and a cross-linkable monomer.

The monomer of Formula (H) can be prepared by reacting the monomer of Formula (C) with the acid of HX or the quaternizing agent of $R_3X$ in the same manner as in the neutralization or the quaternization of the copolymer having recurring units of Formula (A).

In this polymerization the same cross-linkable monomers having plurality of vinyl groups and, if desired, the same monoethylenically unsaturated monomers or conjugated monomers as described above can also be employed in the same manner as described above, and the radical polymerization method as in the polymerization of a monomer mixture comprising the monomer of Formula (C) and a cross-linkable monomer having a plurality of vinyl groups is preferably employed. The polymerization can be carried out in the presence of a radical initiator such as the azo compound as described above. When solution polymerization is conducted, it is necessary to select a solvent which dissolves all the monomers, and as the solvent a polar solvent such as an alcohol, a ketone and an aprotic polar solvent can be preferably employed due to the high polarity of the monomer of Formula (H). Further, a monomer mixture comprising the monomer of Formula (H) and a cross-linkable monomer having a plurality of vinyl groups can be polymerized in the presence of water since the monomer of Formula (H) is soluble in water. In this case, a water soluble peroxide such as cumene sodium peroxide and a redox system catalyst such as sodium peroxodisulfate, potassium peroxodisulfate, potassium peroxodisulfate/sodium sulfate and sodium chlorate/sodium sulfite can be employed. However, the cross-linkable monomer and, if desired, a monoethylenically unsaturated monomer or a conjugated monomer are required to be water soluble. In some cases, suspension polymerization can not give a good result since the monomer of Formula (H) is water soluble.

The copolymer having recurring units of Formulae (B) and (B)' of this invention has anion exchangeability. When $R_1$, $R_2$ and $R_3$ are hydrogen atoms at the same time, the copolymer acts a strongly basic anion exchanger and when $R_1$, $R_2$ and $R_3$ are other groups than hydrogen atoms, the polymer acts as a weakly basic anion exchanger.

The important features of ion-exchange resins such as particle size, density basicity, exchange capacity and rate of exchange can be measured by the conventional methods described in, for example, "Ion Exchange Resins", Chapter 15 by Robert Kunin as previously described.

As described above, the copolymers of this invention can be produced without using poisonous compounds either on an experimental scale or on an industrial scale. The copolymers of this invention have a wide range of use as weakly basic or strongly basic anion exchange resins and adsorbents for acidic substances.

The present invention will now be illustrated in greater detail with reference to several Examples, but they are given for illustrative purposes only and are not to be construed as limiting the invention.

SYNTHESIS 1 p-Diethylaminoethylstyrene p-Diethylaminoethylstyrene was synthesized according to the method reported by Tsuruta et al. [Makromol. Chem., 177, 3255–3263 (1976)].

In a 200 ml three necked flask were placed 26 g of p-divinylbenzene and 40 ml of cyclohexane, and to the mixture were further added 40 ml of a cyclohexane solution of an amide-amine complex prepared from 14.8 g of diethylamine and 0.512 g of n-butyllithium. The mixture thus obtained was heated at 50° C. for 3 hours with stirring. Then the reaction solution was added with 10 ml of methanol and subjected to distillation to give 29.0 g of p-diethylaminoethylstyrene having a boiling point of about 84° C./1 mmHg.

Infrared Absorption Spectrum: 1800, 1620, 1505, 1195, 1060, 980, 895, 820 cm$^{-1}$.

Elemental Analysis: C: 82.65%, H: 10.58%, N: 6.80%.

SYNTHESIS 2 p-Ethylaminoethylstyrene

In a 500 ml stainless steel autoclave equipped with a stirrer, there were charged 240 ml of tetrahydrofuran which was dried over metallic sodium and subjected to distillation. Then, the autoclave was sufficiently cooled externally with a mixture of dry ice-methanol. A bomb containing ethylamine (manufactured by Tokyo Kasei Kogyo Co., Ltd.) was connected to the autoclave and ethylamine was introduced into the autoclave by opening the valve. From the change in weight of the bomb before and after introduction, 18.9 g of ethylamine was confirmed to be introduced. While stirring the mixture, 25.2 ml of 15% n-butyl lithium n-hexane solution were introduced. Subsequently, a solution of 54.6 g of p-divinylbenzene dissolved in 120 ml of dry n-hexane was added to the mixture. The autoclave was placed in a water bath maintained at 25° C. and stirring was continued for 2 hours. To the reaction mixture was added 0.5 g of methanol, and the solvent was removed by an evaporator. The product thus obtained was mixed with water and extracted with n-hexane, dried on magnesium sulfate overnight, followed by distillation to give 44 g of the distillate exhibiting a boiling point of 72° C. to 73° C./0.13 mmHg. This produce was confirmed to be a single compound by gas chromatography. This compound was found to have the following analytical results.

Elemental Analysis for $C_{12}H_{17}N$: Calculated (%): C: 82.23, H: 9.78, N: 7.99 Found (%): C: 81.95, H: 9.91, N: 8.03

Infrared Absorption Spectrum: 3280, 1620, 1510, 1120, 985, 900, 820 cm$^{-1}$

SYNTHESIS 3 p-Isopropylaminoethylstyrene

In a 300 ml four necked flask equipped with a thermometer, a reflux condenser, an inlet for nitrogen and a stirrer were charged 1860 ml of dry n-hexane and 148 g of iso-propylamine. While stirring the mixture, 119 ml of a 15% n-butyllithium n-hexane solution were added dropwise thereto. During the addition, the temperature was maintained at 5° C. to 7° C. The color of the solution was changed from colorless to pale yellow. After 10 minutes, 325 g of p-divinylbenzene having a purity of 96% were added to the mixture, whereby the color of the reaction mixture was changed to brown. Then, the inner temperature was elevated to 45° C., at which the reaction was continued for 6 hours. After the reaction, the reaction was terminated with ethanol and the solvent was evaporated. The residue was poured into 2 l of n-hexane and the insoluble are filtered off, followed by evaporation and distillation, whereby there were obtained 230 g of the product having a boiling point of 62° C.-64° C./0.08 mmHg.

Elemental Analysis for $C_{13}H_{19}N$: Calculated (%): C: 82.48, H: 10.12, N: 7.40; Found (%): C: 82.65, H: 10.18: N: 7.32.

Infrared Absorption Spectrum (liquid film): 3300, 1630, 1510, 1470, 1380, 1080, 990, 910, 835 cm$^{-1}$.

SYNTHESIS 4 p-Dimethylaminoethylstyrene

In a 2 l four necked flask equipped with a Graham condenser, a thermometer and two dropping funnel were placed a magnetic stirrer and 100 g of n-hexane which had been dried with sodium metal and distilled. The flask was externally cooled with a mixed liquid of methanol and dry ice. After the mixed liquid of methanol and dry ice was circulated through the condenser, the end of the condenser was connected to a bomb containing dimethylamine (manufactured by Tokyo Kasei Kogyo Co., Ltd.) and dimethylamine was introduced into the flask by opening the valve. From the change in weight of the bomb before and after the introduction of dimethylamine, 115.4 g of dimethylamine was confirmed to be introduced. While stirring the n-hexane dimethylamine solution with the magnetic stirrer, 77 g of a 15% n-butyllithium n-hexane solution were added dropwise to the mixture from one dropping funnel at such a rate that the inner temperature of the flask did not rise over −60° C., resulting in a yellowish solution. Subsequently, a mixed liquid of 435 g of dry n-hexane and 332 g of p-divinylbenzene was added dropwise to the solution from the other dropping funnel at such a rate that the inner temperature of the flask did not rise −60° C. to give a light green reaction solution. After completion of the addition of the mixed liquid, stirring was continued for 3.5 hours and as a result, the inner temperature of the flask rose to −20° C. When part of the product was sampled and subjected to quantitative analysis of the p-divinylbenzene by gas chromatography the amount of the p-divinylbenzene found was 15% of that at the start, and the reaction was terminated with 10 ml of methanol. The reaction mixture was added with 1 l of water and extracted twice with n-hexane, and the oil phase was dried on magnesium sulfate overnight, followed by distillation to give 250 g of the distillate having a boiling point of 75° C. to 80° C./0.4 mmHg. This product was confirmed to be a single compound by gas chromatography. This compound was found to have the following analytical values.

Elemental Analysis for $C_{12}H_{17}N$: Calculated (%): C: 82.23, H: 9.78, N: 7.99; Found (%): C: 82.08, H: 9.86, N: 8.07.

Infrared Absorption Spectrum: 2920, 2740, 1620, 1500, 1440, 1250, 1130, 1030, 980, 890, 820 cm$^{-1}$.

SYNTHESIS 5

In a 200 ml round bottomed flask was charged a variety of mixtures of an amine and a solvent as set forth in Table 1, and to the mixture were injected a 15% n-butyllithium n-hexane solution and p-divinylbenzene in an amount as set forth in Table 1 via a syringe under stirring with a magnetic stirrer and the reaction was carried out under the reaction conditions as set forth in Table 1. The reaction mixture was added with methanol in an equimolar amount to the n-butyllithium employed, poured into 100 ml of water, extracted three times with 100 ml of ethyl ether, dried on magnesium sulfate overnight, followed by evaporation of the ether to give a product. The product thus obtained was purified and isolated by gas chromatography or liquid chromatography and subjected to elemental analysis. The results are shown in Table 1.

The results of elemental analysis of the crystals are as follows;

Elemental Analysis:
Calculated (%): C: 61.41, H: 8.57, N: 4.10, Br: 25.91.
Found (%): C: 61.53, H: 8.39, N: 4.49, Br: 25.59.

EXAMPLE 1 p-Diethylaminoethylstyrene-Divinylbenzene Copolymer

In a 200 ml four necked flask equipped with a stirrer, a reflux condenser and a thermometer were placed 100 g of pure water in which 0.5 g of partially saponified polyvinyl alcohol having a degree of saponification of 88% and a viscosity of its 2% aqueous solution of 23 cps and 2 g of sodium chloride had been dissolved, followed by addition of a mixture of 16.4 g of the p-diethylaminoethylstyrene as prepared in Synthesis 1, 3.6 g of divinylbenzene having a purity of 56% and a mole ratio of metaisomer to para-isomer of 7 to 3 and containing 44% by weight of ethylvinylbenzene and 0.2 g of 2,2'-

TABLE 1

| Run No. | Amine (g) | Solvent (ml) | n-Butyl-Lithium Solution* (ml) | p-Divinyl-benzene (g) | Reaction Temperature (°C.) | Reaction Period of Time (hour) | Elemental Analysis (%) |
|---|---|---|---|---|---|---|---|
| 1 | p-Propylamine 11.8 | Tetrahydrofuran 62.5 | 3 | 13.0 | 30 | 2 | C: 82.66 H: 10.02 N: 7.28 |
| 2 | sec-Butylamine 7.3 | Tetrahydrofuran 72.9 | 3 | 13.0 | 30 | 3 | C: 83.02 H: 10.51 N: 6.56 |
| 3 | Cyclohexylamine 9.9 | Tetrahydrofuran 71.2 | 3 | 13.0 | 30 | 3 | C: 83.54 H: 10.13 N: 6.02 |
| 4 | Octadecylamine 27 | Hexane 100 | 4 | 13.0 | 50 | 5 | C: 83.92 H: 12.26 N: 3.63 |
| 5 | Benzylamine 12 | Hexane 100 | 5 | 13.6 | 50 | 8 | C: 86.27 H: 7.86 N: 6.04 |
| 6 | Aniline 9.5 | Tetrahydrofuran 100 | 4 | 12.8 | 40 | 8 | C: 86.24 H: 7.48 N: 6.19 |
| 7 | Diallylamine 19.7 | Tetrahydrofuran 120 | 4 | 13.0 | 50 | 5 | C: 84.71 H: 9.26 N: 6.16 |
| 8 | Di-n-hexylamine 18.6 | Tetrahydrofuran 120 | 4 | 13.0 | 50 | 5 | C: 83.66 H: 12.02 N: 4.16 |

*15% n-butyllithium hexane solution

SYNTHESIS 6

4-Vinylphenethylammonium bromide

All the procedures were conducted in a dry nitrogen atmosphere since the product was extremely hygroscopic. In a 100 ml two necked flask equipped with a three way cock 8.6 g of the p-diethylaminoethylstyrene as obtained in Synthesis 1 were dissolved in 35 ml of absolute methanol and then 12.7 ml of ethyl bromide were injected via a syringe. The quaternization was completed after 48 hours at 40° C. without any side reactions. After the reaction mixture was concentrated under reduced pressure, 100 ml of ethyl acetate were injected via a syringe to immediately precipitate white crystals. The crystals thus formed were separated from the solution by filtration under a dry nitrogen atmosphere, washed with ethyl acetate, dried in vacuum and recrystallized from methanol-ethyl acetate solution.

azobisisobutyronitrile with stirring. Then the mixture was stirred at 60° C. for 1 hour, at 70° C. for 2 hours and further at 80° C. for 4 hours. After the reaction the reaction mixture was extracted with toluene and the amount of monomer remaining was quantitatively analyzed and found to be 1% by weight of p-diethylaminoethylstyrene based on the weight of the feed. The copolymer thus produced was spherical particles having a particle diameter of 50 to 200μ.

Infrared Absorption Spectrum (KBr method): 1600, 1505, 1195, 1060, 810 cm$^{-1}$.

Elemental Analysis: C: 84.50%, H: 9.95%, N: 5.65%.

EXAMPLE 2

Porous p-Diethylaminoethylstyrene-Divinylbenzene Copolymer

Into a 500 ml four necked flask were charged 6 g of hydroxyapatite, 3 g of sodium chloride, 0.3 g of sodium lauryl sulfate and 330 g of pure water, and the mixture was added a mixture of 12.8 g of the same p-diethylaminoethylstyrene as prepared in Synthesis 1, 7.2 g of the same divinylbenzene as in Example 1, 20 g of acetophenone, 20 g of ethyl benzoate and 0.3 g of 2,2'-azobisisobutyronitrile under stirring. Then the mixture was stirred at 60° C. for 1 hour, at 70° C. for 2 hours and further at 80° C. for 4 hours. The copolymer in the form of particles thus obtained was thoroughly washed with water on a 300 mesh sieve and repeatedly washed with acetone using a glass filter. Then part of the copolymer was subjected to vacuum drying at 60° C. for 8 hours. The porous structure of the copolymer dried were measured by a mercury penetration porosimeter.

| Average Pore Diameter: | 280 A |
|---|---|
| Pore Volume: | 0.7 ml/g |

EXAMPLE 3

Anion Exchangeability of Copolymer

Each of the copolymers obtained in Examples 1 and 2 was packed into a glass column having an inner diameter of 1.2 cm and equipped with a glass filter at a height of several centimeters, and 200 ml of 1 N hydrochloric acid were flowed down through the column and the height of the copolymer packed was measured. Then 100 ml of acetone were flowed through the column and subsequently 100 ml of a 1 N potassium nitrate solution were flowed through the column and the chlorine ion in the potassium nitrate solution passed was quantitatively analyzed by the Fajans' method. Furthermore, 100 ml of 1 N hydrochloric acid was flowed through the column and then the copolymer packed was withdrawn from the column, subjected to vacuum drying at 80° C. for 18 hours and subsequently weighed. The results are shown in Table 2. The apparent volume of the copolymer in 1 N hydrochloric acid was 1.28 times greater than that in 0.1 N sodium hydroxide.

TABLE 2

| Copolymer No. | Exchange Capacity | | Bulk Density in 1N HCl |
|---|---|---|---|
| | Per Dry Weight (meq/g) | Per Wet Volume (meq/ml) | |
| Example 1 | 3.92 | 1.30 | 0.33 |
| Example 2 | 2.89 | 0.64 | 0.22 |

EXAMPLE 4

Quaternization of Copolymer

Into a 50 ml pressure bottle were 2.0 g of the same dried copolymer as prepared in Example 2, 10 g of dimethyl sulfoxide and 5.7 g of methyl iodide and the bottle was hermetically sealed and left to stand at 60° C. for 300 hours. Then the copolymer was withdrawn from the bottle and packed into a glass column equipped with a glass filter, and 200 ml of acetone was flowed through the column to wash the copolymer and subsequently 300 ml of 4 N hydrochloric acid was flowed through the column. Further the copolymer was washed with 100 ml of acetone and in the same manner as in Example 3 the chlorine ion bonded to the copolymer was quantitatively analyzed to find to be 5.72 mmole. Then the following solutions (i) to (iv) were successively flowed through the column.

(i) 200 ml of pure water
(ii) 200 ml of 1 N sodium hydroxide solution
(iii) 200 ml of pure water
(iv) 100 ml of 1 N sodium chloride solution The hydroxyl ion in the solution (iv) passed was found to be 1.60 mmole by neutralization titration. As a result, the degree of quaternization was 28% (1.60/5.72). The volume of the copolymer with the solution (iv) shrank 4% as compared to that with the solution (ii).

Elemental Analysis: C: 73.39%, H: 9.28%, N: 4.91%, C: 12.08%.

EXAMPLE 5

The procedures of Example 2 were repeated except that the mixture of the monomers, organic liquid medium and initiator as shown below was employed. The properties of the copolymers thus obtained are set forth in Table 3.

| Mixture I | (g) | Mixture II | (g) |
|---|---|---|---|
| p-Ethylaminoethyl-styrene | 15.4 | p-Isopropylaminoethyl-styrene | 5.4 |
| 56% Divinylbenzene | 8.6 | 56% Divinylbenzene | 8.6 |
| 2,2'-Azobisisobutyronitrile | 0.3 | 2,2'-Azobisisbutyronitrile | 0.3 |
| Toluene | 6 | Toluene | 6 |
| n-Octane | 30 | n-Octane | 30 |

TABLE 3

| | Copolymer I | Copolymer II |
|---|---|---|
| Rate of Polymerization | 99% | 98% |
| Average Pore Size | 50–500μ | 60–500μ |
| Exchange Capacity | 3.20 meq/g | 2.98 meq/g |
| Bulk Density (in 1N HCl) | 0.22 | 0.19 |
| Average Pore Diameter | 320 A | 440 A |
| Pore Volume | 1.19 ml/g | 0.92 ml/g |
| Swellability (height of resin packed column swollen by changing water as the outer solution to 1N HCl) | | |

EXAMPLE 6

The procedures of Example 1 were repeated except that the amounts of the p-dimethylaminoethylstyrene and the divinylbenzene were changed to 14.6 g and 5.4 g. The rate of polymerization was 99% and spherical particles having a particle diameter of 40 to 250μ were obtained.

Infrared Absorption Spectrum: 1590, 1500, 1440, 1380, 1250, 1130, 1030, 860, 800, 700 cm$^{-1}$;

Exchange Capacity: 3.62 meq/g;

Bulk Density (in HCl solution): 0.43.

Elemental Analysis: C: 85.02%, H: 9.25%, N: 5.99%.

EXAMPLE 7

In a 2 l four necked flask equipped with a stirrer, reflux condenser and thermometer were placed 800 g of pure water in which 5 g of methyl cellulose having a viscosity of 2% aqueous solution of 100 cps and 10 g of sodium chloride had been dissolved and thoroughly mixed, followed by addition of a mixture of the monomers and organic liquid medium as set forth in Table 4 with stirring. Then the mixture thus obtained was stirred at 70° C. for 5 hours and further at 80° C. for 2 hours. The properties of the copolymers thus obtained are set forth in Table 4.

TABLE 4

| Run No. | Polymerization Monomer Mixture (g) | Polymerization Organic Liquid Medium (g) | Exchange Capacity Per Dry Weight (meq/g) | Exchange Capacity Per Wet Volume (meq/l) | Bulk Density*1 (ml/g) | Average Pore Diameter (A) | Pore Volume (ml/g) | Infrared Absorption Spectrum (cm$^{-1}$) | Elemental Analysis (%) | Swellability**2 (%) |
|---|---|---|---|---|---|---|---|---|---|---|
| 1 | 56% Divinylbenzene 18 Dimethylaminoethylstyrene 82 | Isoamyl acetate 60 Toluene 40 | 3.98 | 0.88 | 0.22 | 180 | 0.28 | 1590,1500, 1440,1030, 810 | C: 83.61 H: 9.92 N: 6.13 | 42 |
| 2 | Ethylene glycol dimethacrylate 17 p-Dimethylaminoethylstyrene 47 | γ-Butyrolactone 57 Isobutylketone 86 | 3.45 | 0.72 | 0.21 | 500 | 1.01 | 1715,1440, 1160–1100, 1030,805 | C: 76.21 H: 9.31 N: 5.44 | 20 |
| 3 | 83% Divinylbenzene 18 Methyl methacrylate 10 m-Dimethylaminoethylstyrene 40 | Dioctyl Adipate 150 | 2.98 | 0.30 | 0.10 | 1200 | 1.45 | 1720,1440, 1195,1030, 810,700 | C: 79.81 H: 9.02 N: 5.48 | 18 |

Note: In Run Nos. 1 to 3, 1% by weight, based on the weight of the monomer mixture of 2,2'-azobisisobutyronitrile was added to the monomer mixture before copolymerization.

*1: In 1N HCl

**2: Swellability (%) = $\frac{h(HCl) - h(NaOH)}{h(NaOH)} \times 100$ h(NaOH): Height of resin packed column in 0.1N NaOH
h(HCl): Height of resin packed column in 1N HCl

EXAMPLE 8

The procedures of Example 7 were repeated except that each of the mixtures of the monomers and the organic liquid medium as set forth in Table 5 was used. The properties of the copolymers thus obtained are set forth in Table 5.

TABLE 5

| Run No. | Polymerization Monomer Mixture (g) | Polymerization Organic Liquid Medium (g) | Exchange Capacity Per Dry Weight (meq/g) | Bulk Density*1 (ml/g) | Average Pore Size (A) | Pore volume (ml/g) | Elemental analysis (%) |
|---|---|---|---|---|---|---|---|
| 1 | p-n-Propylaminoethylstyrene 30 Ethylene glycol diacrylate 20 | Toluene 100 n-Heptane | 2.66 | 0.21 | 60 | 0.24 | C: 71.50 H: 8.62 N: 19.70 |
| 2 | 75% Divinylbenzene 24 p-sec-Butylaminoethylstyrene 36 | Dibutylphthalate 140 | 2.60 | 0.26 | 720 | 0.88 | C: 86.91 H: 9.01 N: 4.48 |
| 3 | 56% Divinylbenzene 10.4 p-Cyclohexylaminoethylstyrene 65.6 | — | 2.98 | 0.42 | — | — | C: 84.70 H: 9.91 N: 4.86 |
| 4 | 56% Divinylbenzene 26.8 p-Ethylaminoethylstyrene 53.2 Methyl methacrylate 20 | Cyclohexanol 150 | 2.68 | 0.23 | 90 | 0.42 | C: 79.86 H: 9.08 N: 4.46 |
| 5 | p-Isopropylaminoethylstyrene 38 Ethylene glycol dimethacrylate 12 | Cyclohexanone 20 Cyclohexanol 130 | 3.52 | 0.19 | 250 | 0.86 | C: 78.23 H: 8.44 N: 5.76 |
| 6 | 56% Divinylbenzene 18 p-Isopropylaminoethylstyrene 17 4-Vinylpyridine 15 | Dioctyl phthalate 150 | 3.96 | 0.16 | 1500 | 1.88 | C: 85.13 H: 8.09 N: 6.62 |
| 7 | m-Divinylbenzene 6 p-Isopropylaminoethylstyrene 25 Acrylonitrile 13 | Toluene 180 | 3.02 | 0.24 | 500 | 1.68 | C: 81.66 H: 8.35 N: 9.96 |

TABLE 5-continued

| | Polymerization | | Polymer | | | | |
|---|---|---|---|---|---|---|---|
| | | | Exchange Capacity Per Dry Weight | Bulk Density*[1] | Average Pore Size | Pore volume | Elemental analysis |
| Run No. | Monomer Mixture (g) | Organic Liquid Medium (g) | (meq/g) | (ml/g) | (A) | (ml/g) | (%) |
| 8 | 83% Divinylbenzene 18<br>p-Octadecylaminoethylstyrene 42 | Isooctanol 140 | 1.58 | 0.19 | 3600 | 2.88 | C: 86.50<br>H: 11.09<br>N: 2.36 |
| 9 | p-Benzylaminoethylstyrene 136<br>Polyethylene glycol dimethacrylate (Average Molecular Weight: 800) 24 | — | 3.10 | 0.39 | — | — | C: 85.21<br>H: 8.36<br>N: 5.44 |
| 10 | p-Anilinoethylstyrene 72<br>56% Divinylbenzene 128 | — | 2.51 | 0.43 | — | — | C: 88.19<br>H: 7.81<br>N: 4.56 |
| 11 | p-Diallylaminoethylstyrene 35<br>p-Divinylbenzene 15 | Methyl benzoate 60<br>n-Heptane 120 | 2.66 | 0.18 | 1200 | 1.20 | C: 88.01<br>H: 8.00<br>N: 4.51 |
| 12 | p-Di(n-hexyl)aminoethyl-styrene 80<br>56% Divinylbenzene 20 | Cyclohexanone 80<br>n-Hexane | 2.30 | 0.26 | 550 | 0.77 | C: 86.58<br>H: 9.86<br>N: 3.66 |
| 13 | p-Di(β-aminoethyl)amino-ethylstyrene 164<br>56% Divinylbenzene 36 | — | 7.51 | 0.39 | — | — | C: 75.62<br>H: 10.30<br>N: 14.55 |

Note: In Run Nos. 1 to 13, 1% by weight, based on the weight of the monomer mixture, of 2,2'-azobisisobutyronitrile was added to the monomer mixture before copolymerization.
*[1]: In 1N HCl

EXAMPLE 9

In a 200 ml three necked flask were charged 10 g of the copolymer as obtained in Run No. 1, Example 7, 100 ml of acetone and 24 g of benzyl bromide and the reaction was conducted for 12 hours under refluxing with stirring. After the reaction, the copolymer was thoroughly washed with acetone and water, and the degree of quaternization was measured according to the method of Example 4.

Degree of Quaternization: 32%
Elemental Analysis: C: 76.87%, H: 8.37%, N: 5.22%.

EXAMPLE 10

In a 100 ml pressure-resistant glass tube were charged 30 g of p-diethylaminoethylstyrene, 11 g of acrylonitrile, 9 g of 56% divinylbenzene and 0.5 g of 2,2'-azobis(2,4-dimethylvaleronitrile) and uniformly mixed. Then the tube was melt-sealed and heated at 60° C. for 3 hours and further at 70° C. for 4 hours. After cooling, the contents were taken out of the tube, finely pulverized and subjected to wet classification with a set of sieves to collect polymer particles having a particle size of 80 to 200 Tyler mesh. After the polymer particles thus obtained were thoroughly washed with methanol and various properties were measured.

Exchange Capacity: 2.60 meq/g
Bulk Density (in 1 N HCl): 0.40
Swellability (as defined in Table 2): 31%
Infrared Absorption Spectrum: 2250, 1600, 1510, 1190, 1065 cm$^{-1}$.

EXAMPLE 11

In a 100 ml pressure-resistant glass tube were charged 32 g of the p-ethylaminoethylstyrene as obtained in Synthesis 2, 18 g of 56% divinylbenzene and 0.5 g of 2,2'-azobisisobutyronitrile and sufficiently mixed. Then the tube was melt-sealed, heated at 80° C. for 6 hours and then opened to give transparent hard mass having a specific gravity of 1.02. The mass thus obtained was pulverized by a grinder and packed into a column to measure the exchange capacity of the copolymer.

Exchange Capacity: 3.16 meq/g
Infrared Absorption Spectrum: 1600, 1510, 1440, 1110, 1020, 820, 790, 700 cm$^{-1}$.
Elemental Analysis: C: 86.02%, H: 8.93%, N: 5.05%.

EXAMPLE 12

32 g of the p-isopropylaminoethylstyrene as obtained in Synthesis 3, 18 g of 56% divinylbenzene and 0.5 g of 2,2'-azobisisobutyronitrile were thoroughly mixed and charged in a 100 ml pressure-resistant glass tube. Then the glass tube was melt-sealed and heated at 80° C. for 8 hours and then the mass obtained was taken out of the glass tube, finely pulverized, packed into a column and washed with acetone.

Bulk Density (in acetone): 0.44
Exchange Capacity: 2.93 meq/g
Infrared Absorption Spectrum: 1600, 1510, 1440, 1380, 1165, 820, 700 cm$^{-1}$.
Elemental Analysis: C: 86.21%, H: 9.03%, N: 4.82%.

EXAMPLE 13

In a 50 ml glass tube were charged 6.25 g of the 4-vinylphenethylammonium bromide as obtained in Synthesis 6, 2 g of N,N'-methylenediacrylamide, 18.2 g of water, 10 mg of sodium sulfate and 27 mg of potassium peroxodisulfate and homogeneously mixed and to the mixture was added hydrochloric acid to adjust the pH of the mixture to 3.3. Then the tube was melt-sealed and left to stand at 40° C. for 24 hours and the polymer obtained was taken out of the glass tube, pulverized by a grinder and subjected to the same measurement of exchange capacity as in Example 3.

Exchange Capacity: 2.42 meq/g
Bulk Density (in 1 N HCl): 0.21

COMPARATIVE EXAMPLE

In a 3 l four necked flask equipped with a stirrer, reflux condenser and a thermometer were charged 1,500 g of pure water in which a partially saponified polyvinyl alcohol having a degree of saponification of 88% and a viscosity of 2% aqueous solution of 23 cps and 30 g of sodium chloride had dissolved, followed by addition of a mixture of 64 g of p-chloromethylstyrene, 36 g of 56% divinylbenzene, 100 g of toluene, 100 g of decalin and 2 g of 2,2'-azobisisobutyronitrile with stirring. Then the mixture was stirred at 60° C. for one hour, at 70° C. for two hours and further at 80° C. for four hours.

The copolymer in the form of particles thus obtained was placed in a glass filter, washed with 1,000 ml of water and then with 1,000 ml of acetone and charged in a 1 l four necked flask. Then to the copolymer were added 400 ml of acetone and 70 g of 50% diethylamine aqueous solution and the mixture was stirred for 16 hours under refluxing. The product thus obtained was thoroughly washed with acetone and then with water. Part of the anion exchange capacity of the product was measured in accordance with the method of Example 3 and the exchange capacity per dry weight of the product was 2.52 meq/g and that per wet volume of the product was 0.63 meq/ml.

While the invention has been described in detail and with reference to specific embodiments thereof, it will be apparent to one skilled in the art that various changes and modifications can be made therein without departing from the spirit and scope thereof.

What is claimed is:

1. A process for producing a copolymer having recurring units of Formula (A)

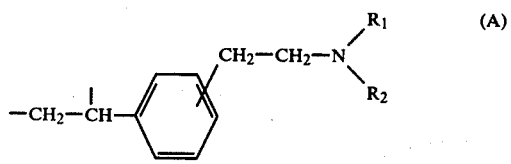

(A)

which comprises polymerizing a monomer mixture consisting essentially of about 6 to about 98% by weight of a monomer of Formula (C),

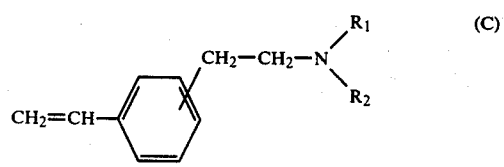

(C)

wherein $R_1$ and $R_2$ which may be the same or different, each represents a hydrogen atom or a hydrocarbon group selected from the group consisting of $C_{1-20}$ alkyl groups, $C_{3-10}$ cycloalkyl groups, $C_{3-8}$ alkenyl groups, $C_{6-15}$ aryl groups, $C_{7-12}$ arylalkyl groups and $C_{1-15}$ aminoalkyl groups, and about 2 to 94% by weight of divinylbenzene based on the total weight of the monomer of Formula (C) and the divinylbenzene.

2. The process of claim 1, wherein $R_1$ and $R_2$ in Formula (C) are $C_{1-20}$ alkyl groups.

3. The process of claim 1, wherein $R_1$ and $R_2$ in Formula (C) are $C_{1-8}$ alkyl groups.

4. The process of claim 2, wherein $R_1$ and $R_2$ in Formula (C) are methyl groups.

5. The process of claim 2, wherein $R_1$ and $R_2$ in Formula (C) are ethyl groups.

6. The process of claim 1, wherein $R_1$ in Formula (C) is a hydrogen atom and $R_2$ in Formula (C) is a $C_{1-8}$ alkyl group.

7. The process of claim 6, wherein $R_1$ in Formula (C) is a hydrogen atom and $R_2$ in Formula (C) is an ethyl group.

8. The process of claim 6, wherein $R_1$ in Formula (C) is a hydrogen atom and $R_2$ in Formula (C) is an isopropyl group.

9. The process of claim 6, wherein $R_1$ in Formula (C) is a hydrogen atom and $R_2$ in Formula (C) is a n-propyl group.

10. The process of claim 6, wherein $R_1$ in Formula (C) is a hydrogen atom and $R_2$ in Formula (C) is a cyclohexyl group.

11. The process of claim 1, wherein $R_1$ and $R_2$ in Formula (C) are $C_{1-15}$ aminoalkyl groups.

12. The process of claim 11, wherein $R_1$ and $R_2$ in Formula (C) are aminoethyl groups.

13. The process of claim 1, wherein the $CH_2=CH$- group is in the para position to the

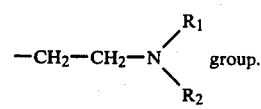

group.

14. The process of claim 1, wherein the monomer mixture additionally comprises up to about 92% by weight of a monoethylenically unsaturated monomer or a conjugated monomer based on the total weight of the monomer of Formula (C), the divinylbenzene and the monoethylenically unsaturated monomer or a conjugated monomer.

15. The process of claim 1, wherein the polymerization is conducted in the presence of a radical initiator.

16. The process of claim 15, wherein the radical initiator is an azo compound.

17. The process of claim 1, wherein the polymerization is conducted in the presence of an organic liquid medium which does not react with the monomer mixture and/or in the presence of a linear polymer.

18. The process of claim 1, wherein the polymerization is conducted as suspension polymerization.

19. A process for producing a copolymer having recurring units of the formula

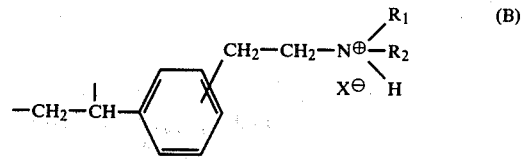

(B)

which comprises reacting a copolymer as produced in claim 33 having recurring units of Formula (A)

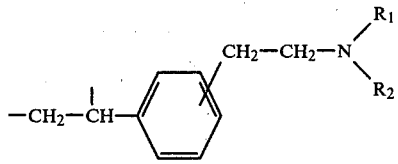

(A)

with an acid HX, wherein X is an acid radical selected from the group consisting of a halogen atom, ½SO$_4$, ½SO$_3$, HSO$_4$, NO$_3$, NO$_2$, ½CrO$_4$, SCN, ClO$_4$, OH, H$_2$PO$_4$, ½HPO$_4$, ⅓PO$_3$, HCO$_3$, ½CO$_3$, CN, MnO$_4$, R$_4$COO wherein R$_4$ is a C$_{1-20}$ alkyl group, a C$_{6-15}$ aryl group, a C$_{1-10}$ haloalkyl group or a C$_{1-10}$ hydroxyalkyl group, R$_5$SO$_3$ wherein R$_5$ is a methyl group, an ethyl group or a C$_{6-20}$ aryl group, CH$_3$OSO$_3$ and C$_2$H$_5$OSO$_3$.

20. A process for producing a copolymer having recurring units of Formula (B)

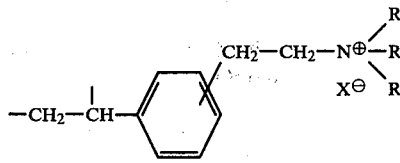

(B)

which comprises quaternizing a copolymer as produced in claim 1 having recurring units of Formula (A) with a quaternizing agent R$_3$X wherein R$_3$ is a hydrogen atom or a hydrocarbon group selected from the group consisting of C$_{1-20}$ alkyl groups, C$_{3-10}$ cycloalkyl groups, C$_{3-8}$ alkenyl groups, C$_{6-15}$ aryl groups, C$_{7-12}$ arylalkyl groups and C$_{1-15}$ aminoalkyl groups; and X is an acid radical selected from the group consisting of ½SO$_4$, ½SO$_3$, HSO$_4$, NO$_3$, NO$_2$, ½CrO$_4$, SCN, ClO$_4$, OH, H$_2$PO$_4$, ½HPO$_4$, ⅓PO$_3$, HCO$_3$, ½CO$_3$, CN, MnO$_4$, R$_4$COO wherein R$_4$ is a C$_{1-20}$ alkyl group, a C$_{6-15}$ aryl group, a C$_{1-10}$ haloalkyl group, CH$_3$OSO$_3$ and C$_2$H$_5$OSO$_3$.

21. A process for producing a copolymer having recurring units of Formula (B)

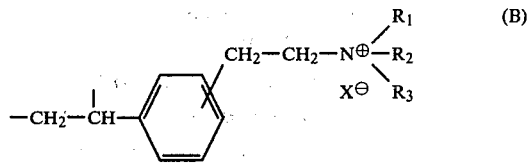

(B)

which comprises polymerizing a monomer mixture consisting essentially of about 6 to about 98% by weight of a monomer of Formula (H),

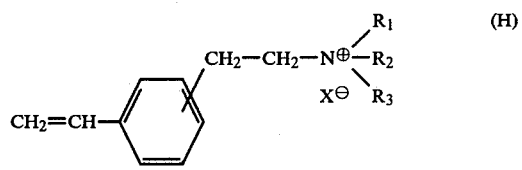

(H)

wherein R$_1$, R$_2$ and R$_3$ which may be the same or different, each represents a hydrogen atom or a hydrocarbon group selected from the group consisting of C$_{1-20}$ alkyl groups, C$_{3-10}$ cycloalkyl groups, C$_{3-8}$ alkenyl groups, C$_{6-15}$ aryl groups, C$_{7-12}$ arylalkyl groups and C$_{1-15}$ aminoalkyl groups; and X is an acid radical selected from the group consisting of a halogen atom, ½SO$_4$, ½SO$_3$, HSO$_4$, NO$_3$, NO$_2$, ½CrO$_4$, SCN, ClO$_4$, OH, H$_2$PO$_4$, ½HPO$_4$, ⅓PO$_3$, HCO$_3$, ½CO$_3$, CN, MnO$_4$, R$_4$COO wherein R$_4$ is a C$_{1-20}$ alkyl group, a C$_{6-15}$ aryl group, a C$_{1-10}$ haloalkyl group or a C$_{1-10}$ hydroxyalkyl group, R$_5$SO$_3$ wherein R$_5$ is a methyl group, an ethyl group or a C$_{6-20}$ aryl group, CH$_3$OSO$_3$ and C$_2$H$_5$OSO$_3$,
and about 2 to about 94% by weight of divinylbenzene based on the total weight of the monomer of Formula (H) and the divinylbenzene.

* * * * *